(12) United States Patent
Hartford

(10) Patent No.: US 6,925,723 B1
(45) Date of Patent: Aug. 9, 2005

(54) THREE-DIMENSIONAL TEMPLATE FOR FOOTWEAR DESIGN

(75) Inventor: Sean Donal Hartford, Gaston, OR (US)

(73) Assignee: Nike, Inc., Beaverton, OR (US)

( * ) Notice: Subject to any disclaimer, the term of this patent is extended or adjusted under 35 U.S.C. 154(b) by 9 days.

(21) Appl. No.: 10/438,248

(22) Filed: May 13, 2003

(51) Int. Cl.[7] .............................................. G01B 3/14
(52) U.S. Cl. ........................ 33/562; 33/3 R; 12/128 R
(58) Field of Search ............................. 33/562, 3 R, 4, 33/5, 6, 512, 513; 12/128 R, 133 R

(56) References Cited

U.S. PATENT DOCUMENTS

| | | | | |
|---|---|---|---|---|
| 384,448 | A | * | 6/1888 | Keller .............................. 425/2 |
| 1,175,428 | A | * | 3/1916 | Freeman ...................... 106/687 |
| 2,002,580 | A | * | 5/1935 | MacDonald ............... 12/146 L |
| 2,119,590 | A | * | 6/1938 | MacDonald ................. 264/152 |
| 2,247,818 | A | * | 7/1941 | Nast ......................... 12/133 M |
| 2,610,340 | A | * | 9/1952 | Nettler et al. .............. 12/128 R |
| 3,137,875 | A | * | 6/1964 | Bingham, Jr. .............. 12/128 R |
| 3,262,124 | A | * | 7/1966 | Johnson et al. ................ 360/66 |
| 3,983,204 | A | * | 9/1976 | Opinsky et al. ............. 264/244 |
| 4,266,750 | A | * | 5/1981 | Gallizia ......................... 249/65 |
| 5,650,211 | A | * | 7/1997 | Randolph ...................... 428/57 |
| 5,885,500 | A | * | 3/1999 | Tawney et al. ............. 264/154 |
| 6,299,817 | B1 | * | 10/2001 | Parkinson .................... 264/402 |

OTHER PUBLICATIONS

Webpage from Hobbytron.com of Visible Man model. This product was on sale at least one year prior to the filing date of the instant application (1 page).

Webpage from Dryeraseboard.com disclosing a magnetic steel dry erase board. This product was on sale at least one prior to the filing date of the instant application (4 pages).

* cited by examiner

Primary Examiner—Christopher W. Fulton
Assistant Examiner—Amy R. Cohen
(74) Attorney, Agent, or Firm—Banner & Witcoff, Ltd.

(57) ABSTRACT

A three-dimensional template for aesthetically and structurally designing an article of footwear is disclosed. The template includes a shell that defines an exterior surface. A marking instrument may be utilized to inscribe designs on the exterior surface. The shell may have an opaque or transparent configuration. A model of a foot or bones of the foot may be located within the shell. The model may be utilized as a reference in designing the footwear.

41 Claims, 6 Drawing Sheets

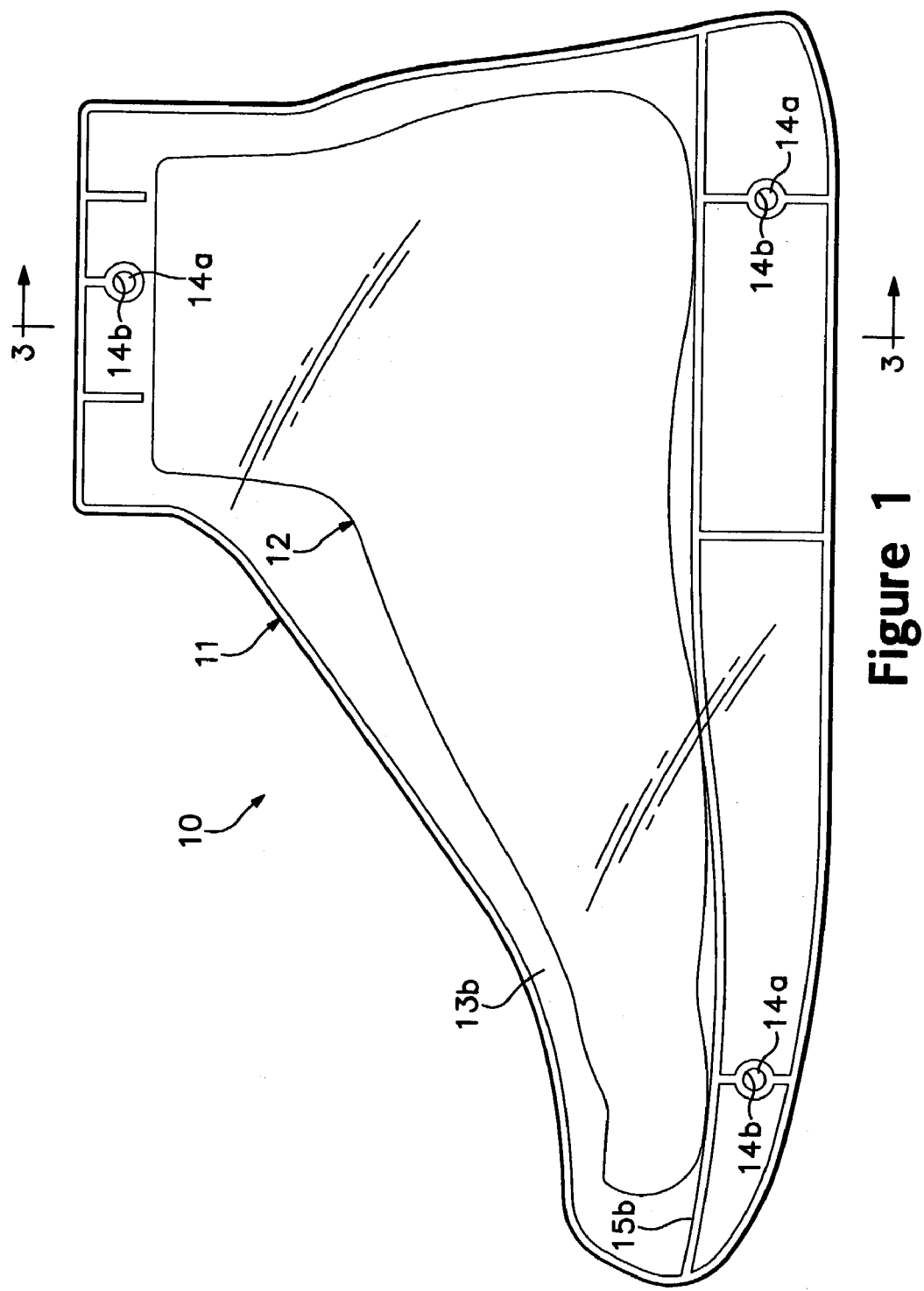

US 6,925,723 B1

THREE-DIMENSIONAL TEMPLATE FOR FOOTWEAR DESIGN

BACKGROUND OF THE INVENTION

1. Field of the Invention

The present invention relates to articles utilized in the process of footwear design. The invention concerns, more particularly, a three-dimensional template that is suitable for use by individuals engaged in the conception of aesthetic or structural designs for an article of footwear.

2. Description of Background Art

Conventional articles of footwear generally include two primary elements, an upper and a sole structure. The upper is secured to the sole structure and forms a void on the interior of the footwear for securely and comfortably receiving a foot. The upper is generally formed from multiple elements that are stitched and adhesively bonded together to form a comfortable structure for receiving the foot. With respect to athletic footwear, in particular, the upper may include an exterior formed of multiple material elements that include leather and polymer textiles, for example. The material elements may be selected to enhance the performance of the footwear while simultaneously providing the footwear with a particular aesthetic. That is, the material elements may be selected to provide water-resistance, durability, abrasion-resistance, and breathability, while varying in shape, texture, and color to promote the aesthetics of the upper. In addition, the interior of the upper may include foam materials to enhance the comfort of the upper, and moisture-wicking textiles may be positioned adjacent the foot to limit the perspiration within the upper.

The sole structure of athletic footwear includes a midsole that is structured to attenuate ground reaction forces and absorb energy as the footwear contacts the ground. The polymer foams suitable for midsoles permit the addition of colorants that aesthetically match the midsole to the upper. The midsole may also be molded to include ornamentation or other aesthetic features. The outsole generally provides a durable, wear-resistant outer surface for the sole, and may also be molded to impart an appearance that is aesthetically-consistent with the upper and midsole.

Based upon the discussion above, the process of designing an article of footwear involves incorporating both structural and aesthetic considerations into the various footwear components. A conventional manner of relaying conceptions regarding the design of footwear to other individuals often involves the preparation of two-dimensional drawings. That is, footwear designers generally produce two-dimensional drawings of a proposed structural or aesthetic aspect of an article of footwear. Various individuals other than the designer, including the individuals involved in the production of the footwear, must interpret the two-dimensional drawings and may not fully appreciate the manner in which the designer intends the footwear to appear when translated to the footwear itself, which is in three-dimensions. Accordingly, two-dimensional design drawings may not be an effective manner of relaying conceptions regarding the design of footwear to other individuals.

As an alternative to two-dimensional drawings, some footwear designers utilize computer-assisted drawing programs to model conceptions regarding footwear design in three dimensions. Although computer-assisted drawing programs may be an effective manner of overcoming the deficiencies of traditional drawings, the cost and time associated with the preparation of computer-generated drawings limits the overall effectiveness and practicality of the computer as a design medium.

SUMMARY OF THE INVENTION

The present invention is a three-dimensional template for designing an article of footwear. The template includes a shell that defines an exterior surface. The exterior surface has the general proportions of an exterior of the article of footwear, and the shell is formed of a material that accommodates markings from a marking instrument. The template may be utilized by an individual to aesthetically and structurally design the footwear. In designing the footwear, the individual utilizes the marking instrument to inscribe designs on the exterior surface of the shell.

The shell, or at least a portion of the shell, may be formed of an opaque or at least partially transparent material. In addition, the shell may define an interior void located to generally correspond with a position of a void for receiving a foot in the article of footwear. When the shell is formed of a transparent material, a model may be positioned within the interior void so as to be at least partially visible through the shell. The model may have the proportions of the foot, or the model may represent the bones of the foot. In order to properly position the model within the void, an interior support located to generally correspond with a position of an insole in the article of footwear may be utilized, with the model being positioned adjacent to the interior support.

The marking instrument provides marks on the exterior surface that correspond with designs for the article of footwear. The marking instrument may be an erasable marker, graphite pencils, colored pencils, or a paint brush and paint, for example. When the template is utilized in combination with erasable markers, for example, the exterior surface of the shell may generally have a substantially smooth texture, or any other texture that is suitable for the marking instrument.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

FIG. 1 is an elevational view of a first footwear template in accordance with the present invention.

DETAILED DESCRIPTION OF THE INVENTION

Figure 2A:
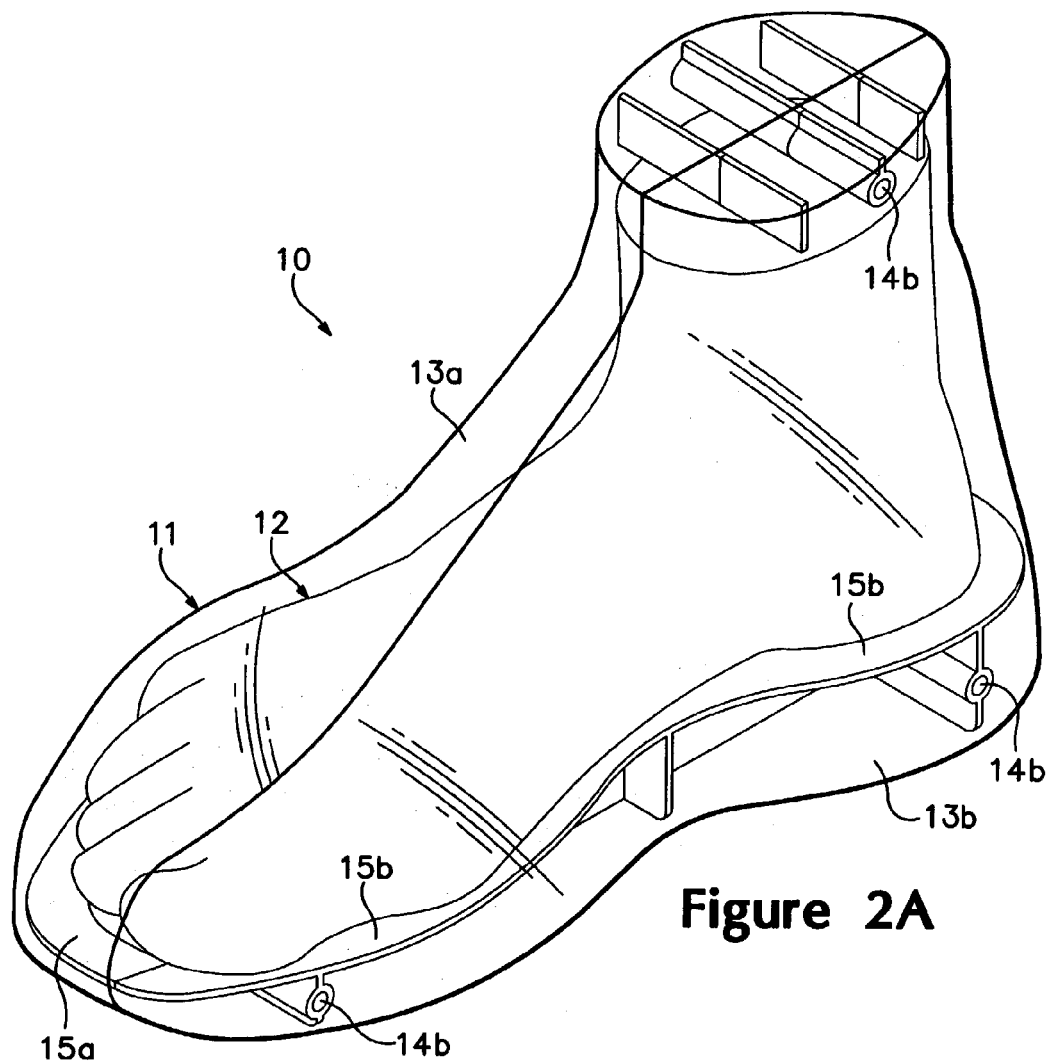
FIG. 2A is a perspective view of the first footwear template.
Figure 2B:
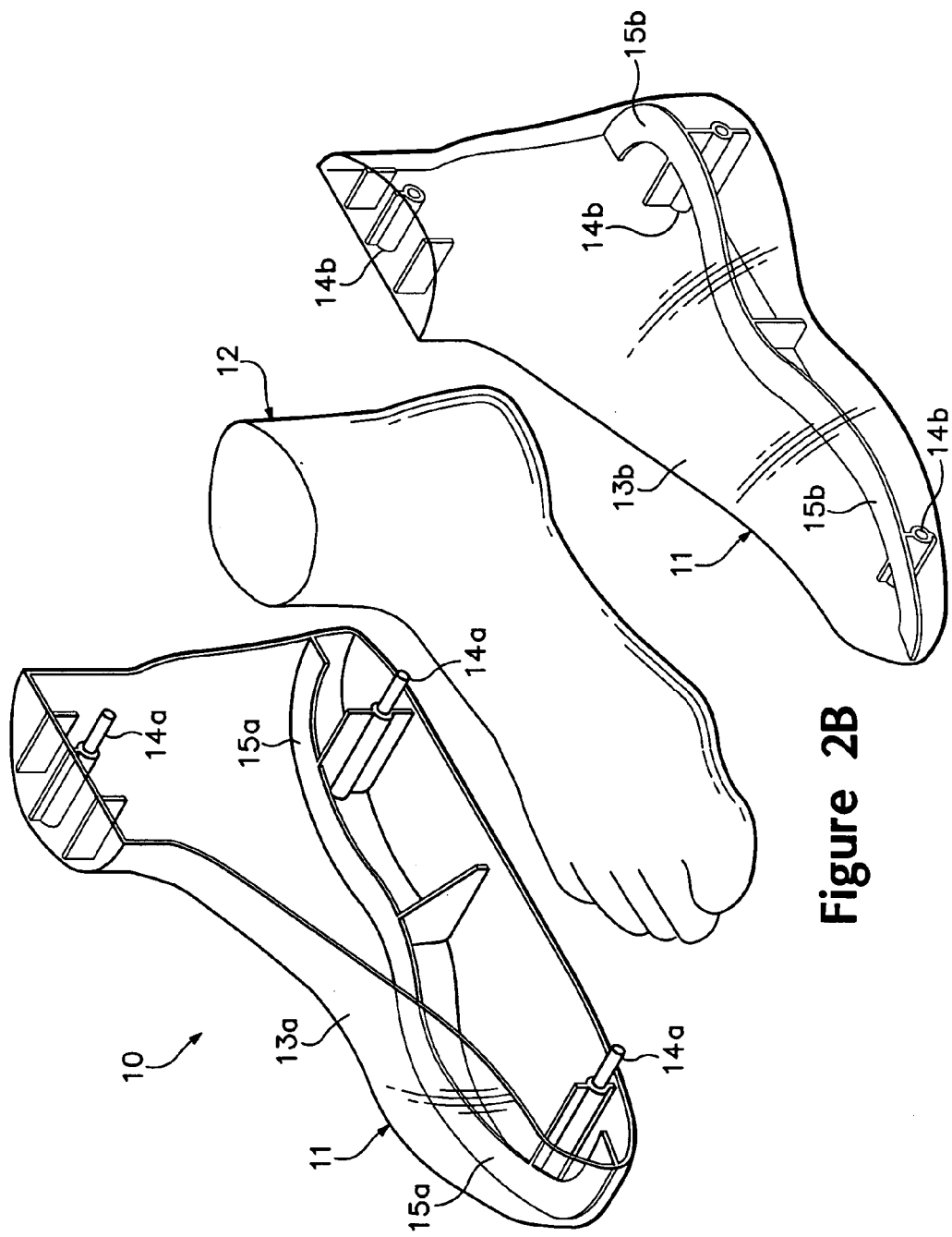
FIG. 2B is an exploded perspective view of the first footwear template.
Figure 3:
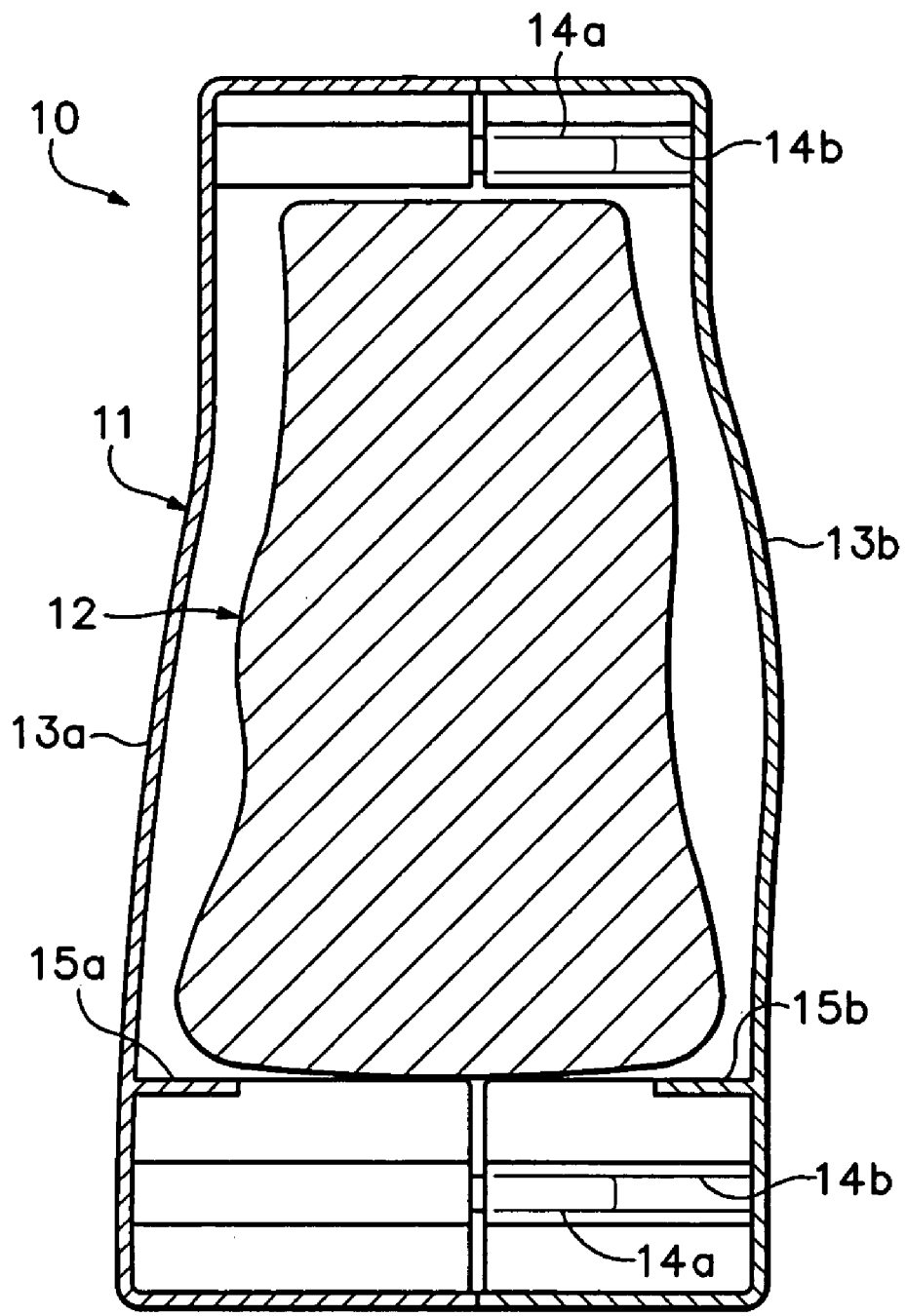
FIG. 3 is a cross-sectional view of the first footwear template, as defined by line 3—3 in FIG. 1.
Figure 4:
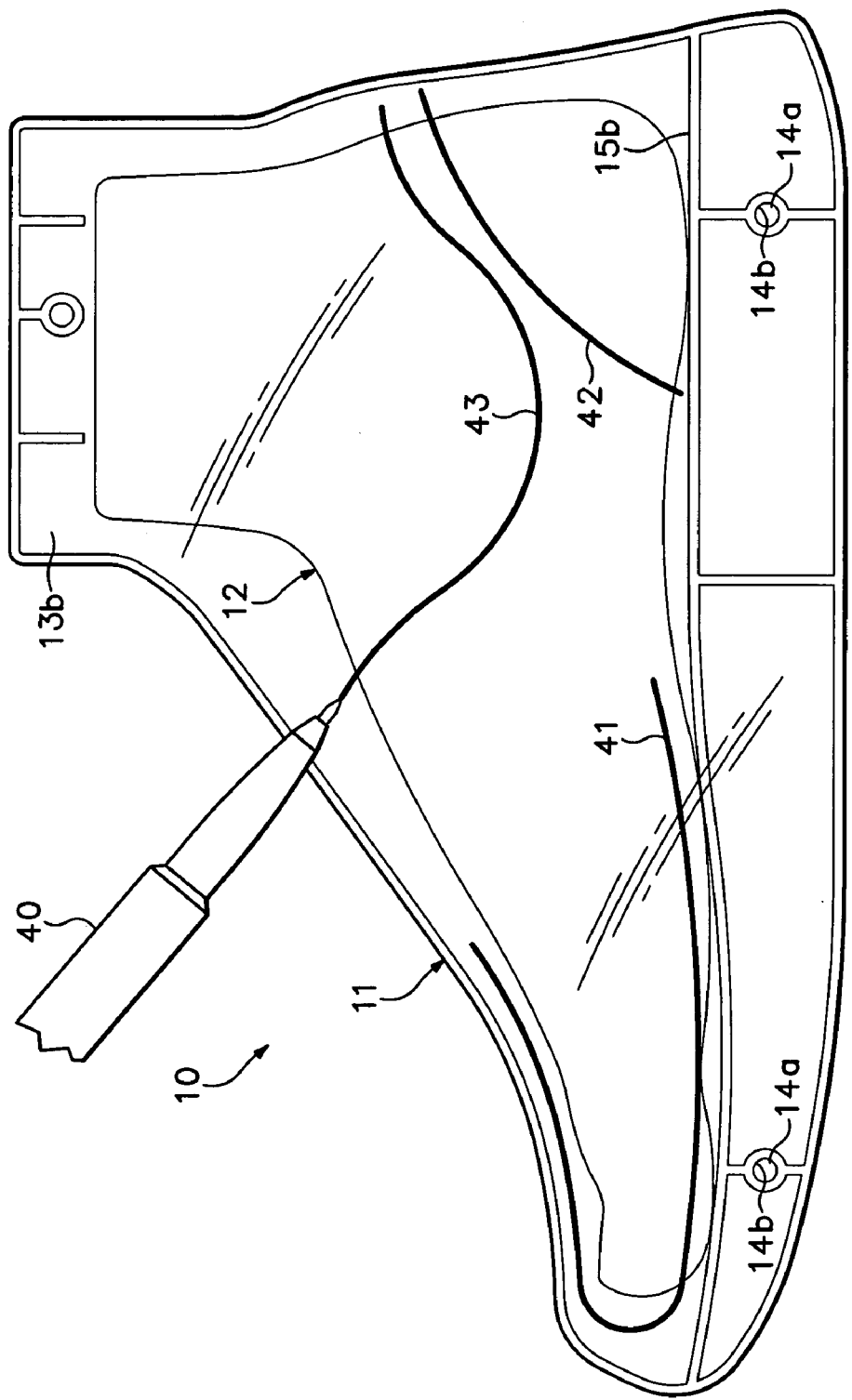
FIG. 4 is an elevational view of the first footwear template with aesthetic and structural designs inscribed thereon with a marking instrument.
Figure 5:
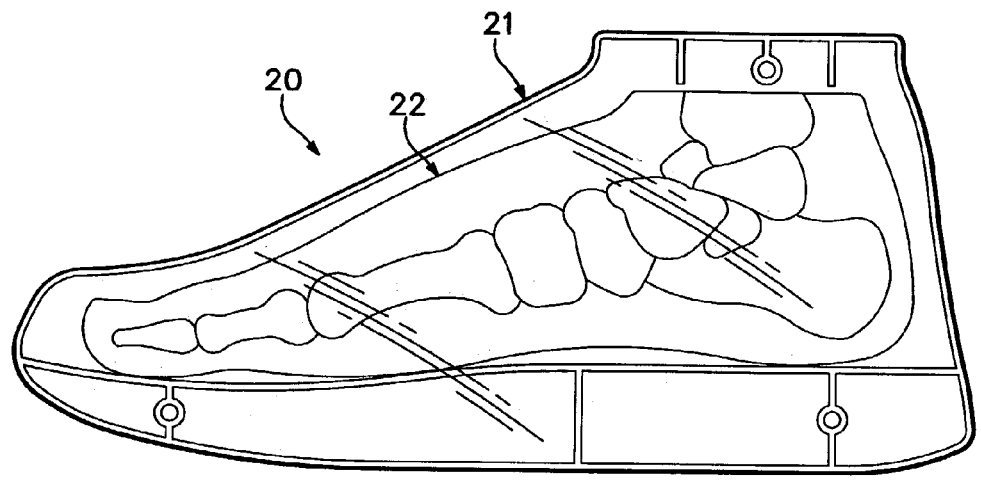
FIG. 5 is an elevational view of a second footwear template in accordance with the present invention.
Figure 6:
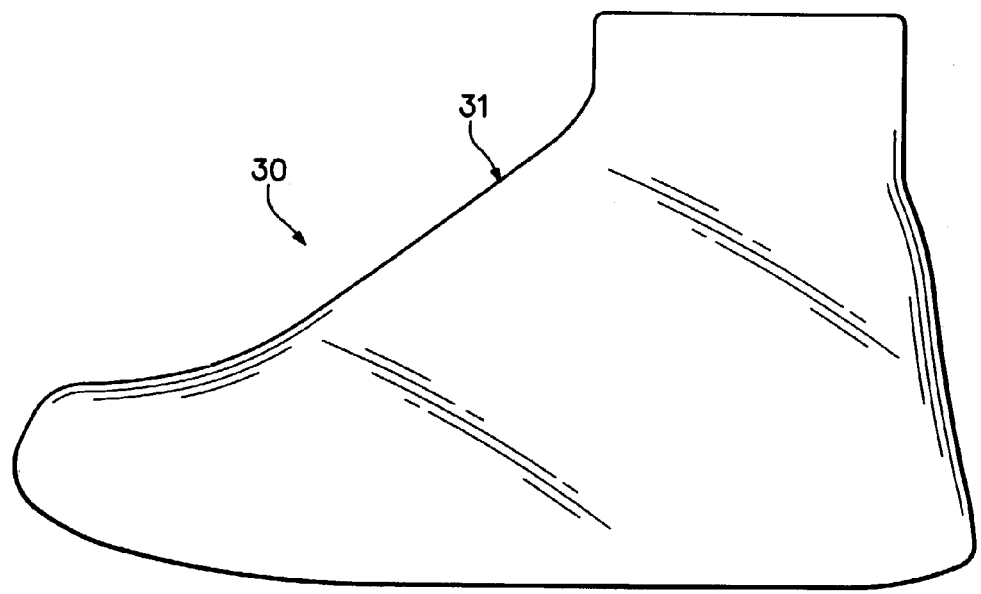
FIG. 6 is an elevational view of a third footwear template in accordance with the present invention.

The following discussion and accompanying figures disclose three embodiments of footwear templates in accordance with the present invention. The footwear templates have a three-dimensional configuration and are suitable for use by individuals engaged in the conception and design of footwear aesthetics and structures, thereby aiding in the overall process of footwear design. A first footwear template 10 is depicted in FIGS. 1–4 and has a transparent exterior shell with a model of a foot positioned on the interior. A second footwear template 20 is depicted in FIG. 5 and also has a transparent exterior shell, but includes an osteological model of the foot on the interior. In addition, a third footwear template 30 is depicted in FIG. 6 and has an opaque exterior shell. In each embodiment, a marking instrument 40 is utilized to illustrate footwear designs on the exterior of the various templates 10, 20, and 30, thereby providing a three-dimensional representation of the footwear aesthetics and structures that are designed by an individual.

The shapes of footwear templates 10 and 30, as depicted in the figures, generally conforms to the shape of an article of footwear suitable for basketball. Similarly, the shape of footwear template 20 generally conforms to the shape of an article of footwear suitable for running. Footwear templates 10, 20, and 30, however, may be adjusted to have the shape of any style of athletic footwear, including tennis shoes, golf shoes, baseball shoes, walking shoes, and cross-training shoes, for example. In addition, footwear templates 10, 20, and 30 may exhibit the shape of non-athletic footwear, including dress shoes, boots, loafers, or sandals, for example. Other types of footwear that may be aesthetically and structurally designed with a footwear template in accordance with the present invention include ski boots, snowboarding boots, and in-line skates. Accordingly, the specific shape of footwear templates 10, 20, and 30 are provided as an example of the many types of footwear that may be represented by footwear templates in accordance with the present invention.

Footwear template 10 is depicted in FIGS. 1–4 and includes two primary components, a shell 11 and a model 12. Shell 11 forms the exterior of footwear template 10 and has the general proportions of an article of footwear. One skilled in the relevant art will recognize, however, that conventional articles of footwear have diverse shapes, sizes, and configurations. Accordingly, shell 11, which has the proportions of an article of footwear, may also have diverse shapes, sizes, and configurations that generally conform with the proportions of an article of footwear. The material forming shell 11 is at least semi-transparent and defines an interior void. Model 12 is positioned within the void formed by shell 11 and has the general proportions of a foot that is received by the article of footwear. A space may be formed between model 12 and the sides of shell 11, with the space representing the general thickness of the footwear upper represented by model 12. The position of model 12 is selected, therefore, to correspond with the position of the foot that is received within the void of the article of footwear represented by shell 11.

As discussed in the prior paragraph, the material forming shell 11 is at least semi-transparent. Alternatively, portions of shell 11 may be transparent or translucent, and other portions of shell 11 may be opaque. In further embodiments, which will be described below, a substantial portion of shell 11 may be opaque. Accordingly, the transparency of the material forming shell 11 may vary significantly.

Shell 11 includes a lateral portion 13a and a medial portion 13b that are separable to provide access for inserting and removing model 12. Lateral portion 13a includes three protrusions 14a that correspond with three indentations 14b in medial portion 13b. When joining lateral portion 13a with medial portion 13b, protrusions 14a and inserted into indentations 14b, and friction securely retains the connection. A benefit to the separable configuration of shell 11 is that an alternate version of model 12 may be placed within shell 11. For example, an individual may prefer that model 12 represent the bone structure of the foot. Alternately, lateral portion 13a and medial portion 13b may be permanently attached with an adhesive, thereby permanently locating model 12 within shell 11. As further alternatives, lateral portion 13a and medial portion 13b may be secured together with a hinged structure or a snap-fit configuration, for example. Accordingly, a plurality of structures may be utilized to secure lateral portion 13a and medial portion 13b.

Each of lateral portion 13a and medial portion 13b include a ledge 15a and 15b, respectively. Ledges 15a and 15b provide a support for model 12 within shell 11. The top surface of ledges 15a and 15b may be positioned to correspond with the top surface of an insole in the footwear represented by shell 11. In this configuration, model 12 will be positioned above and adjacent to ledges 15a and 15b, thereby locating model 12 in a position that corresponds with the position of a foot that is received by the footwear represented by shell 11.

In most articles of footwear the top surface of the insole generally represents a dividing line between the upper and the sole structure. That is, portions of the footwear located above the upper surface of the insole correspond with the upper, and portions of the footwear located below the upper surface of the insole correspond with the sole structure. Although portions of the upper may extend below the upper surface of the insole, and portions of the sole structure may extend above the upper surface of the insole, the relationship described above is generally accurate with respect features that are visible from the exterior of footwear. Ledges 15a and 15b also demarcate, therefore, the portions of shell 11 that are intended to represent the upper and the sole structure of the article of footwear. More particularly, the upper surface of ledges 15a and 15b represent the footbed, or area of the footwear upon which the foot rests.

The material forming shell 11 is selected to be at least semi-transparent, thereby permitting model 12 to be viewed through shell 11. As depicted in FIGS. 1–4, shell 11 is fully transparent. This configuration permits model 12 to be clearly viewed through shell 11. Some individuals may prefer, however, that shell 11 have a lesser degree of transparency to partially obscure model 12 and to ensure that designs inscribed on the exterior surface of shell 11 are readily visible and distinguishable from other portions of footwear template 10. The material forming shell 11 is also selected to provide proper surface characteristics for receiving and at least temporarily retaining footwear designs inscribed on the exterior shell 11 with marking instrument 40. For example, marking instrument 40 is utilized to inscribe the designs on the exterior surface of shell 11. Different types of marking instruments 40 are usable on different surfaces. For example, a smooth surface, as depicted in FIGS. 1–4, may be most suitable for erasable markers, and a rougher surface may be most suitable from colored pencils or paint. Based upon the above discussion suitable materials for shell 11 include glass and a wide range of polymers, such as polystyrene.

Model 12 is positioned within the void formed by shell 11 and has the general proportions of a foot that is received by the article of footwear. The purpose of footwear template 10 is to provide a template for designing aesthetic and structural aspects of an article of footwear. The position and dimensions of model 12 may influence the design. Accordingly, the position and dimensions of model 12 are selected to correspond with the position of a foot that is received by the article of footwear represented by shell 11. Alternative structures for model 12 will be discussed below with respect to footwear template 20.

The specific material selected for model 12 may vary significantly within the scope of the present invention. Polymer foams, such as ethyl vinyl acetate and polyurethane, provide durable, lightweight, and inexpensive materials for model 12. Stone, metal, or glass materials may impart an alternate aesthetic to footwear template 10. In addition, non-foamed polymers may be utilized. Accordingly, a variety of materials are suitable for model 12.

Footwear template 10, as described above, is intended to provide a three-dimensional template for the aesthetically and structurally designing an article of footwear. A method of utilizing footwear template 10 in this manner will now be described with reference to FIG. 4, in which footwear template 10 is depicted in combination with marking instrument 40. Initially, shell 11 is free from marks or other designs as an individual begins conceiving of aesthetic and structural footwear designs. As the individual conceives of aesthetic and structural footwear designs, however, the individual may utilize marking instrument 40 to place representations of the designs on the exterior surface of shell 11. In contrast with FIGS. 1–3, therefore, FIG. 4 depicts footwear template 10 as having a plurality of designs 41–43 inscribed on the exterior surface of shell 11 by marking instrument 40.

Design 41 is an aesthetic line that extends from an instep portion of shell 11 to a toe portion of shell 11, and then curves backward to generally correspond with a lower portion of model 12. The specific location of design 41 may correspond, therefore, with the contours of model 12. Accordingly, the individual may utilize model 12 in determining the proper position for aesthetic aspects of an article of footwear. Design 42 is positioned on a portion of shell 11 that corresponds with a heel portion of shell 11 and may represent a heel counter in the article of footwear. A heel counter is a semi-rigid structural element that extends around the heel to assist in stabilizing the foot. The individual may also, therefore, utilize model 12 in determining the proper position of structural elements of the article of footwear. Design 43 is then inscribed on a portion of shell 11 that corresponds with a lateral side of the article of footwear. The contours of designs 41–43 may be selected to provide the article of footwear with aesthetic appeal, and the contours may be selected to represent structural elements of the footwear. Furthermore, footwear template 10 may be utilized for elements that serve both aesthetic and structural purposes. For example, designs 41–43 positioned on the portion of shell 11 corresponding with the sole structure may be utilized to show indentations in the sole structure that promote bending of the sole structure and simultaneously illustrate and aesthetic manner of accomplishing the bending.

Designs are inscribed on the exterior of shell 11 by marking instrument 40. As discussed above, different types of marking instruments 40 are usable on different surfaces. As depicted in FIGS. 1–4, the exterior surface of shell 11 has a smooth texture. When formed of a polymer material, for example, the smooth texture of shell 11 may be suitable for marking instruments 40 that have the form of erasable markers, whether dry-erase markers or wet-erase markers. A benefit to utilizing erasable markers is that changes in the designs inscribed on shell 11 may be effected by utilizing a cloth to remove a portion of the designs. The erasable marker may then be utilized to properly redraw the erased portions. Alternately, marking instrument 40 may be a graphite pencil, a colored pencil, or a paint brush and paint, for example. In addition, marking instrument 40 may be an etching device, such as an engraver, that removes a portion of shell 11 to form the designs. Accordingly, marking instrument 40 may be any device that provides suitable marks upon the exterior of shell 11.

Based upon the above discussion, footwear template 10 provides a medium for three-dimensionally representing conceptions regarding aesthetic and structural footwear components. Shell 11 forms an exterior of footwear template 10 and provides a surface for receiving marks corresponding with the aesthetic and structural designs. Model 12 is positioned within shell 11 and provides a reference relating to the position of a foot within the footwear being designed.

A variety of alternate footwear template configurations will now be discussed. With reference to FIG. 5, footwear template 20 is depicted as having a shell 21 and a model 22. Whereas shell 11 has the configuration of a basketball shoe, shell 21 has the configuration of a running shoe. Footwear templates of the present invention may be utilized to aesthetically and structurally design a plurality of footwear types. By modifying the configuration of the shell to correspond with the desired footwear type, footwear templates may be configured to correspond with a wide range of footwear types, as listed in the above discussion. Model 12 is described as having the shape of a foot. Some individuals, however, may prefer that an osteological model of the foot be located within shell 21 to provide further insight into the position of various portions of the foot. For example, an osteological model may provide greater comprehension regarding the position of the joints between the proximal phalanges and the metatarsal bones. As depicted in FIG. 5, therefore, model 22 includes a representation of the various bones within the foot.

The specific configuration of model 22 may vary to include solely the bones of the foot or a transparent material that encompasses the bones and has the shape of the foot. That is, model 22 may include a transparent material that has the shape of model 12, but also includes other polymer elements corresponding with the bones of the foot. Although both shell 21 and portions of model 22 are at least semi-transparent, the two materials will be distinguishable, and the bones will be clearly visible on the interior of model 22. In order to enhance the visibility of model 22, a tint may be added to the portion of model 22 corresponding with the foot. This configuration provides the advantage of permitting the individual to simultaneously visualize the boundaries of the foot and the positions of the various bones in relation to shell 21.

An advantage of templates 10 and 20 is that models 12 and 22, respectively, may be removed from the interior of shells 11 and 21. With respect to template 10, model 12 may be utilized in conjunction with shell 11 in order to position designs 41–43, for example. Once designs 41–43 are inscribed on the exterior of shell 11, then model 12 may be removed to provide a clearer perception of the intended structure and aesthetics of the footwear.

Footwear template 30 is depicted in FIG. 6 and includes a shell 31 formed of an opaque material. In contrast with footwear templates 10 and 20, which included models 12 and 22, respectively, footwear template 30 includes only a shell 31. Many individuals have an intuitive knowledge regarding the position of the foot within an article of footwear. Accordingly, some individuals may prefer footwear template 30, which does not incorporate one of models 12 and 22 and has an opaque configuration.

Depending upon the quantity of design that is inscribed on the exterior of footwear template 10, for example, designs from lateral portion 13a may be visible when viewing medial portion 13b. This effect may obscure or complicate the viewing of the designs, particularly when only a small portion of the surface of shell 11 includes designs. In some situations, therefore, the opaque material of shell 31 may provide a more appropriate material.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

What is claimed is:

1. A three-dimensional template for designing an article of footwear, the template comprising a shell that defines an exterior surface with proportions of an exterior of the article of footwear, the shell being formed of an at least partially transparent material that accommodates markings from a marking instrument, and the shell defining an interior void located to generally correspond with a position of a void for receiving a foot in the article of footwear, a model being positioned within the interior void, the model having proportions of at least one of the foot and bones of the foot, and the model being at least partially visible through the shell.

2. The three-dimensional template of claim 1, wherein the material is opaque.

3. The three-dimensional template of claim 1, wherein the shell includes an interior support located to generally correspond with a position of an insole in the article of footwear, the model being positioned adjacent the interior support.

4. The three-dimensional template of claim 1, wherein the model is removable from the shell.

5. The three-dimensional template of claim 1, wherein the shell includes a first portion that is separable from a second portion to provide access to the interior void.

6. The three-dimensional template of claim 5, wherein the first portion is an area of the shell corresponding with a lateral side of the footwear, and the second portion is an area of the shell corresponding with a medial side of the footwear.

7. The three-dimensional template of claim 5, wherein the first portion includes an indentation and the second portion includes a protrusion, the indentation receiving the protrusion to connect the first portion to the second portion.

8. The three-dimensional template of claim 1, wherein the shell is formed of a transparent polymer material.

9. The three-dimensional template of claim 1, wherein the exterior surface has a substantially smooth texture.

10. A three-dimensional template for designing an article of footwear, the template comprising:
a shell that defines an exterior surface and an interior void, the exterior surface having proportions of an exterior of the article of footwear, and the interior void being located to generally correspond with a position of a void for receiving a foot in the article of footwear, the shell being formed of a material that is at least partially transparent and forms the exterior surface to accommodate markings from a marking instrument; and
a model positioned within the interior void, the model having proportions of at least one of the foot and bones of the foot, the model being at least partially visible through the shell.

11. The three-dimensional template of claim 10, wherein the shell includes an interior support located to generally correspond with a position of an insole in the article of footwear, the model being positioned adjacent the interior support.

12. The three-dimensional template of claim 10, wherein the shell includes a first portion that is separable from a second portion to provide access to the interior void.

13. The three-dimensional template of claim 12, wherein the first portion is an area of the shell corresponding with a lateral side of the footwear, and the second portion is an area of the shell corresponding with a medial side of the footwear.

14. The three-dimensional template of claim 12, wherein the first portion includes an indentation and the second portion includes a protrusion, the indentation receiving the protrusion to connect the first portion to the second portion.

15. The three-dimensional template of claim 13, wherein the shell is formed of a transparent polymer material.

16. The three-dimensional template of claim 10, wherein the exterior surface has a substantially smooth texture.

17. The three-dimensional template of claim 10, wherein the model has proportions of the foot, and the bones are visible within the model.

18. The three-dimensional template of claim 10, wherein the model is removable from the shell.

19. A system for designing an article of footwear, the system comprising:
a three-dimensional template that includes:
a shell with an exterior surface having proportions of an exterior of the article of footwear, the shell defining an interior void located to generally correspond with a position of a void in the article of footwear for receiving a foot, and the shell being formed of a material that is at least partially transparent, and
a model positioned within the interior void, the model having proportions of at least one of the foot and bones of the foot, and the model being at least partially visible through the shell; and
a marking instrument for inscribing designs on the exterior surface of the shell.

20. The system of claim 19, wherein the exterior surface is formed of a material that erasably-accommodates markings from the marking instrument.

21. The system of claim 19, wherein the marking instrument is an erasable marker.

22. The system of claim 19, wherein the shell includes an interior support located to generally correspond with a position of an insole in the article of footwear, the model being positioned adjacent the interior support.

23. The system of claim 19, wherein the shell is formed of a transparent polymer material.

24. The system of claim 19, wherein the exterior surface has a substantially smooth texture.

25. The system of claim 19, wherein the shell includes a first portion that is separable from a second portion to provide access to the interior void.

26. The system of claim 25, wherein the first portion is an area of the shell corresponding with a lateral side of the footwear, and the second portion is an area of the shell corresponding with a medial side of the footwear.

27. The system of claim 25, wherein the first portion includes an indentation and the second portion includes an protrusion, the indentation receiving the protrusion to connect the first portion to the second portion.

28. The three-dimensional template of claim 19, wherein the model has proportions of the foot, and the bones are visible within the model.

29. The three-dimensional template of claim 19, wherein the model is removable from the shell.

30. A method of designing an article of footwear with a three-dimensional template, the method comprising steps of:
provide a shell portion of the three-dimensional template, the shell portion defining an exterior surface and an interior void, the exterior surface having proportions of an exterior of the article of footwear, and the interior void being located within the shell portion and in a position that generally corresponds with a position of a void for receiving a foot in the article of footwear;
providing a model portion of the three-dimensional template;
locating the model portion within the interior void; and
utilizing a marking instrument to inscribe designs on the exterior surface.

31. The method of claim 30, wherein the step of providing the shell portion includes selecting a material for the shell portion that accommodates markings from the marking instrument.

32. The method of claim 30, wherein the step of providing the shell portion includes selecting a material for the shell portion that is a transparent polymer material.

33. The method of claim 30, wherein the step of providing the shell portion includes selecting a material for the shell portion that is opaque.

34. The method of claim 30, wherein the step of providing the shell portion includes selecting a material for the shell that is at least partially transparent.

35. The method of claim 30, wherein the step of providing the model portion includes selecting the model portion to have proportions of the foot.

36. The method of claim 30, wherein the step of providing the model portion includes selecting the model portion to have proportions of bones of the foot.

37. The method of claim 30, wherein the step of providing the model portion includes selecting the model portion to be at least partially visible through the shell portion.

38. The method of claim 30, wherein the step of utilizing the marking instrument includes selecting the marking instrument to be an erasable marker.

39. A three-dimensional template for designing an article of footwear, the template comprising a shell that defines an exterior surface and accommodates markings on the exterior surface, the shell having proportions of an exterior of the article of footwear, and the template having a model positioned within the interior void, the model having proportions of at least one of the foot and bones of the foot, and the model being at least partially visible through the shell.

40. The three-dimensional template of claim 39, wherein the material is at least partially transparent.

41. The three-dimensional template of claim 40, wherein the shell defines an interior void located to generally correspond with a position of a void for receiving a foot in the article of footwear.

\* \* \* \* \*